United States Patent
Chou

(10) Patent No.: US 11,340,738 B2
(45) Date of Patent: May 24, 2022

(54) METHOD FOR FORCE SENSING, ELECTRONIC MODULE CAPABLE OF FACILITATING FORCE SENSING, AND COMPUTING APPARATUS

(71) Applicant: NOVATEK MICROELECTRONICS CORP., Hsinchu (TW)

(72) Inventor: Chun-Yi Chou, Hsinchu (TW)

(73) Assignee: NOVATEK MICROELECTRONICS CORP., Hsinchu (TW)

(*) Notice: Subject to any disclaimer, the term of this patent is extended or adjusted under 35 U.S.C. 154(b) by 120 days.

(21) Appl. No.: 16/996,197

(22) Filed: Aug. 18, 2020

(65) Prior Publication Data
US 2022/0057871 A1    Feb. 24, 2022

(51) Int. Cl.
*G06F 3/044* (2006.01)
*G06F 3/041* (2006.01)
*G06V 40/13* (2022.01)

(52) U.S. Cl.
CPC ............ *G06F 3/044* (2013.01); *G06F 3/0412* (2013.01); *G06F 3/04162* (2019.05); *G06V 40/1306* (2022.01); *G06F 2203/04105* (2013.01)

(58) Field of Classification Search
CPC ... G06V 40/1306; G06F 3/044; G06F 3/0447; G06F 2203/04105
See application file for complete search history.

(56) References Cited

U.S. PATENT DOCUMENTS

2018/0032783 A1* 2/2018 Wu .................... G06F 3/041

* cited by examiner

*Primary Examiner* — Priyank J Shah
(74) *Attorney, Agent, or Firm* — Schmeiser, Olsen & Watts, LLP

(57) ABSTRACT

A method for force sensing using information from a display panel with a touch sensor and a fingerprint sensor is introduced. The method includes: obtaining, based on touch sensing data from a touch sensing circuit coupled to the touch sensor, first sensing information indicating capacitance value distribution over a touch sensing area due to pressing of an object on the display panel; obtaining, based on fingerprint sensing data from a fingerprint sensing circuit coupled to the fingerprint sensor, second sensing information indicating an effective pressing area due to the pressing of the object; and generating third sensing information indicating a force corresponding to the pressing of the object, based on the first sensing information and the second sensing information. An electronic module capable of facilitating force sensing and computing apparatus capable of force sensing are also provided.

31 Claims, 16 Drawing Sheets

METHOD FOR FORCE SENSING, ELECTRONIC MODULE CAPABLE OF FACILITATING FORCE SENSING, AND COMPUTING APPARATUS

BACKGROUND OF THE INVENTION

1. Field of the Invention

The present disclosure relates to a technology for force sensing in a computing apparatus, and in particular to a method for force sensing, an electronic module capable of facilitating force sensing, and a computing apparatus.

2. Description of the Related Art

For computing devices, such as smart phones, tablet computers or other information processing devices, touch screens have become indispensable components of the computing devices for user interactions. A user can give input or control the computing device through single-touch or multi-touch gestures by touching the touch screen with one or more fingers or a stylus.

Demand for better touch performance of touch screens of the computing devices continues to increase. In particular, it is expected that force sensing can be implemented on a touch screen to provide information of magnitude of a corresponding force of a touch on the touch screen so as to facilitate a practical application for user interactions with better user experience. To fulfill this, a conventional approach is to implement a panel module, such as a liquid crystal module, with a dedicated force sensor, for example, disposed beneath a LCD and touch sensor and the backlight unit. This approach requires redesign of the mechanical structure and electronic circuitry for the panel module with the additional force sensor, thus inevitably increasing the volume of the computing device and hardware and manufacturing costs.

BRIEF SUMMARY OF THE INVENTION

An objective of the present disclosure is to provide a technology for force sensing in a computing apparatus, in which the force sensing can be implemented using information from a touch sensor and a fingerprint sensor. With the contribution of fingerprint sensing data obtained from signals of the fingerprint sensor and touch sensing data obtained from signals of the touch sensor, the force sensing can be achieved.

To achieve at least the above objective, the present disclosure provides a method for force sensing using information from a display panel with a touch sensor and a fingerprint sensor. The method comprises: obtaining, based on touch sensing data from a touch sensing circuit coupled to the touch sensor, first sensing information indicating capacitance value distribution over a touch sensing area due to pressing of an object on the display panel; obtaining, based on fingerprint sensing data from a fingerprint sensing circuit coupled to the fingerprint sensor, second sensing information indicating an effective pressing area due to the pressing of the object; and generating third sensing information indicating a force corresponding to the pressing of the object, based on the first sensing information and the second sensing information.

In an embodiment, the effective pressing area is within and smaller than the touch sensing area.

In an embodiment, the capacitance value distribution indicates that a plurality of positions within the touch sensing area have respective capacitance values obtainable based on the touch sensing data resulting from deformation of the touch sensor due to the pressing of the object.

In some embodiments, the second sensing information is obtained by averaging fingerprint sensing values within each of a plurality of blocks over a fingerprint sensing area, based on the fingerprint sensing data, so as to obtain the second sensing information indicating the effective pressing area due to the pressing of the object.

In an embodiment, the step of obtaining the second sensing information includes: determining a touch related area based on the first sensing information and a first threshold; and determining the second sensing information based on the touch related area, the fingerprint sensing data, a second threshold, wherein the effective pressing area indicated in the second sensing information is equal to or smaller than the touch related area.

In an embodiment, the touch related area is determined in which each of touch sensing values of the touch related area exceeds or equals the first threshold.

In an embodiment, the second sensing information is determined in which each of fingerprint sensing values of the effective pressing area exceeds or equals the second threshold.

In an embodiment, the third sensing information is generated by performing computation at least based on a first weighted sum of touch sensing values of the first sensing information not corresponding to the effective pressing area, and the contribution of the touch sensing values that correspond to the effective pressing area is reduced in the computation.

In an embodiment, any of the touch sensing values that correspond to the effective pressing area is totally excluded from the computation.

In an embodiment, the touch sensing values that correspond to the effective pressing area is not totally excluded from the computation.

In an embodiment, the third sensing information is generated by performing the computation additionally based on a second weighted sum of fingerprint sensing values of the second sensing information, wherein the touch sensing values that do not correspond to the effective pressing area dominate the results of the computation.

To achieve at least the above objective, the present disclosure further provides an electronic module capable of facilitating force sensing, wherein the electronic module is used to be coupled to a display panel with a touch sensor and a fingerprint sensor. The electronic module comprises a touch sensing circuit, a fingerprint sensing circuit, and at least one control unit. The touch sensing circuit is used for being coupled to the touch sensor and outputting touch sensing data. The fingerprint sensing circuit is used for being coupled to the touch sensor and outputting fingerprint sensing data. The at least one control unit, coupled to the touch sensing circuit and the fingerprint sensing circuit, is configured to perform operations for force sensing including: obtaining, based on the touch sensing data, first sensing information indicating capacitance value distribution over a touch sensing area due to pressing of an object on the display panel; obtaining, based on the fingerprint sensing data, second sensing information indicating an effective pressing area due to the pressing of the object; and generating third sensing information indicating a force corresponding to the pressing of the object, based on the first sensing information and the second sensing information.

In an embodiment, the effective pressing area is within and smaller than the touch sensing area.

In an embodiment, the capacitance value distribution indicates that a plurality of positions within the touch sensing area have respective capacitance values obtainable based on the touch sensing data resulting from deformation of the touch sensor due to the pressing of the object.

In an embodiment, the at least one control unit is configured to average fingerprint sensing values within each of a plurality of blocks over a fingerprint sensing area, based on the fingerprint sensing data, so as to obtain the second sensing information indicating the effective pressing area due to the pressing of the object.

In an embodiment, the at least one control unit is configured to determine a touch related area based on the first sensing information and a first threshold, and determine the second sensing information based on the touch related area, the fingerprint sensing data, a second threshold, wherein the effective pressing area indicated in the second sensing information is equal to or smaller than the touch related area.

In an embodiment, the at least one control unit is configured to determine the touch related area in which each of touch sensing values of the touch related area exceeds or equals the first threshold.

In an embodiment, the at least one control unit is configured to determine the second sensing information in which each of fingerprint sensing values of the effective pressing area exceeds or equals the second threshold.

In an embodiment, the at least one control unit performs computation to generate the third sensing information, at least based on a first weighted sum of touch sensing values of the first sensing information not corresponding to the effective pressing area, and the contribution of the touch sensing values that correspond to the effective pressing area is reduced in the computation.

In an embodiment, any of the touch sensing values that correspond to the effective pressing area is totally excluded from the computation.

In an embodiment, the touch sensing values that correspond to the effective pressing area is not totally excluded from the computation.

In an embodiment, the at least one control unit performs the computation additionally based on a second weighted sum of fingerprint sensing values of the second sensing information, wherein the touch sensing values that do not correspond to the effective pressing area dominate the results of the computation.

In any of the embodiments, the electronic module can be implemented in a single chip.

To achieve at least the above objective, the present disclosure further provides a computing apparatus comprising a display panel, first means, second means, and third means. The display panel is provided with a touch sensor and a fingerprint sensor. The first means, coupled to the touch sensor, is used for obtaining first sensing information indicating capacitance value distribution over a touch sensing area due to pressing of an object on the display panel. The second means, coupled to the fingerprint sensor, is used for obtaining second sensing information indicating an effective pressing area due to the pressing of the object. The third means, coupled to the first means and second means, is used for generating third sensing information indicating a force corresponding to the pressing of the object, based on the first sensing information and the second sensing information. The computing apparatus is capable of performing at least one of operations selectively based on the third sensing information.

In an embodiment, the capacitance value distribution indicates that a plurality of positions within the touch sensing area have respective capacitance values resulting from deformation of the touch sensor due to the pressing of the object.

In an embodiment, the second means is configured to average fingerprint sensing values within each of a plurality of blocks over a fingerprint sensing area so as to obtain the second sensing information indicating the effective pressing area due to the pressing of the object.

In an embodiment, the second means determines a touch related area based on the first sensing information and a first threshold; and the second means determines the second sensing information based on the touch related area, the fingerprint sensing data, a second threshold, wherein the effective pressing area indicated in the second sensing information is equal to or smaller than the touch related area.

In an embodiment, the second means determines the touch related area in which each of touch sensing values of the touch related area exceeds or equals the first threshold.

In an embodiment, the second means determines the second sensing information in which each of fingerprint sensing values of the effective pressing area exceeds or equals the second threshold.

In an embodiment, the third means performs computation at least based on a first weighted sum of touch sensing values of the first sensing information not corresponding to the effective pressing area, and the contribution of the touch sensing values that correspond to the effective pressing area is reduced in the computation.

In an embodiment, any of the touch sensing values that correspond to the effective pressing area is totally excluded from the computation so as to generate the third sensing information.

In an embodiment, the touch sensing values that correspond to the effective pressing area is not totally excluded from the computation.

In an embodiment, the third means performs the computation additionally based on a second weighted sum of fingerprint sensing values of the second sensing information so as to generate the third sensing information, wherein the touch sensing values that do not correspond to the effective pressing area dominate the results of the computation.

In an embodiment, the computing apparatus further comprises: a single chip and a processing unit. The single chip includes the first means, the second means, and third means. The processing unit, coupled between the display panel and the single chip, is configured to perform the at least one of operations selectively based on the third sensing information.

In an embodiment, the computing apparatus further comprises a single chip which includes the first means and the second means, wherein the third means is a processing unit coupled between the display panel and the single chip, and the processing unit is configured to perform the at least one of operations selectively based on the third sensing information.

DETAILED DESCRIPTION OF THE INVENTION

To facilitate understanding of the object, characteristics and effects of this present disclosure, embodiments together with the attached drawings for the detailed description of the present disclosure are provided.

The following provides various embodiments for the technology for force sensing in a computing apparatus, in which the force sensing can be implemented using information from a display panel with a touch sensor and a fingerprint sensor of the computing apparatus. The force sensing can be achieved with the contribution of fingerprint sensing data from the fingerprint sensor and touch sensing data from the touch sensor.

For the sake of illustration, in the following, embodiments of an electronic module capable of facilitating force sensing and a computing apparatus (or device) employing the electronic module are introduced firstly. Then, embodiments of a method for force sensing using information from a display panel with a touch sensor and a fingerprint sensor of the computing apparatus are provided.

Figure 1:
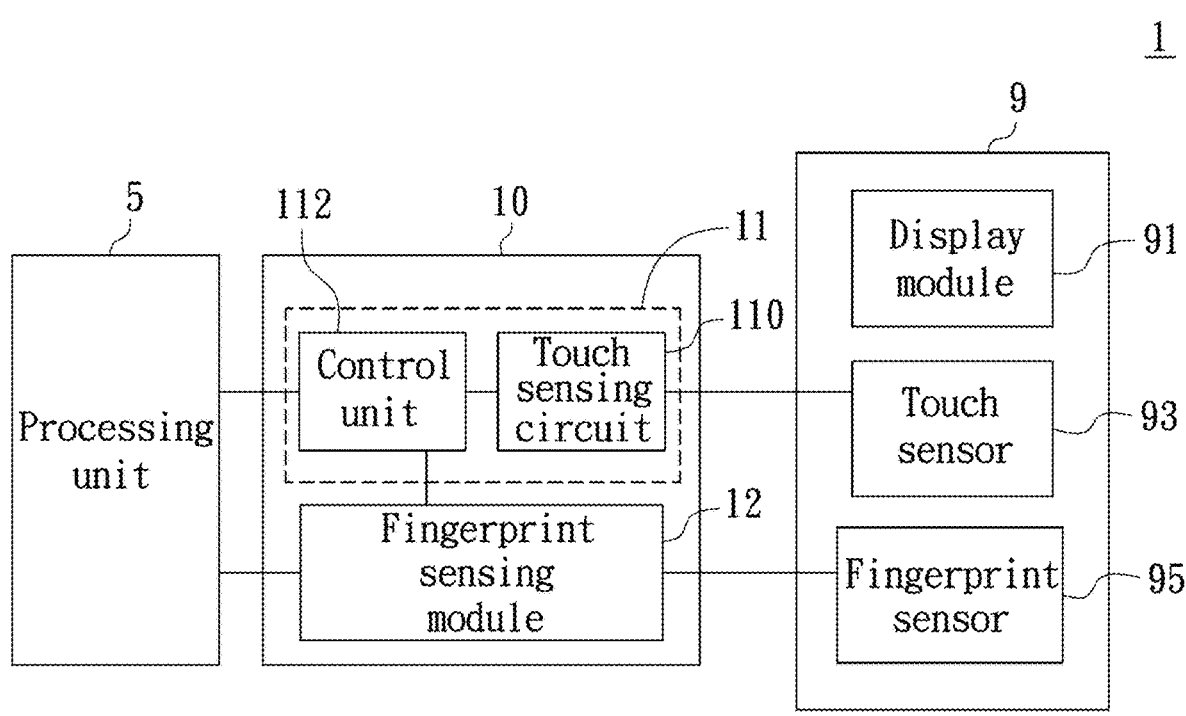
FIG. 1 is a block diagram illustrating an electronic module capable of facilitating force sensing according to an embodiment of the present disclosure, employed in a computing device.

Referring to FIG. 1, an electronic module 10 capable of facilitating force sensing is illustrated, which can be employed in a computing device 1, according to an embodiment of the present disclosure in block diagram form. As shown in FIG. 1, the computing device 1 includes a processing unit 5, a display panel 9, and an electronic module 10. The electronic module 10 capable of facilitating force sensing can be utilized for being coupled between the display panel 9 and the processing unit 5. As will be exemplified later, the electronic module 10 can be configured to perform a method for force sensing illustrated in FIG. 4, in which the electronic module 10 is capable of generating sensing information indicating a force corresponding to the pressing of an object (such as one or more fingers, a stylus, or so on) on the display panel 9, thus achieving force sensing with the contribution of the fingerprint sensing data and the touch sensing data.

Based on the structure of computing device 1 illustrated in FIG. 1, any electronic device such as a smart phone, tablet computer or any other information processing device can be realized, wherein the computing device 1 may further include, but not limited to, additional components such as memory, circuits for wireless or wired communication, image capturing or so on, whenever appropriate.

The processing unit 5 is capable of being configured to control the display panel 9 to provide specific functionality. For example, the processing unit 5 executes an application program under an operating system to control the display panel 9 through the electronic module 10 so that the computing device 1 can interact with a user through the display panel 9. The computing device 1 (e.g., smart phone, tablet, and so on) can be configured to perform one of operations (e.g., user operation or function in a game) associated with different values of force indicated by the sensing information generated by the electronic module 10.

The display panel 9 includes a display module 91, such as a liquid crystal display (LCD) module, organic light emitting diode (OLED) module, or so on, and is provided with a touch sensor 93 and a fingerprint sensor 95. The display panel 9, for example, can be implemented by an in-cell type or on-cell type touch display panel integrated with fingerprint sensing, wherein the display module 91, the touch sensor 93, and the fingerprint sensor 95 are integrated in a layered manner or any appropriate manner. The touch sensor 93 may be implemented by using a capacitive touch sensor 93 in a form of touch sensing array. The fingerprint sensor 95, for example, can be implemented by an optical fingerprint sensor, capacitive fingerprint sensor, ultrasonic fingerprint sensor, or any device for sensing fingerprint signals. In some embodiments, the fingerprint sensor 95 may be implemented to detect at least one portion of the viewable area of image displaying by the display module 91. In a preferred embodiment, the fingerprint sensor 95 is a full-screen fingerprint sensor 95, which can cover a same area substantially for image displaying of the display module 91 and for touch sensing of the touch sensor 93. Certainly, the implementation of the present disclosure is not limited to the above examples.

The electronic module 10 capable of facilitating force sensing can be utilized to be coupled to the display panel 9 with the touch sensor 93 and the fingerprint sensor 95. In FIG. 1, the electronic module 10 can include a touch sensing circuit 110, a fingerprint sensing module 12, and a control unit 112. In an embodiment, the control unit 112 and the touch sensing circuit 110 may be implemented or viewed as a touch sensing module 11. The electronic module 10 can be implemented as a chip. From the viewpoint of the processing unit 5, the electronic module 10 may serve as a "bridge" between the display panel 9 and the processing unit 5. The processing unit 5 may be configured to control the electronic module 10 so as to obtain output touch data and/or output fingerprint data.

The touch sensing circuit 110 can be utilized for being coupled to the touch sensor 93 and obtaining touch sensing data. For example, the touch sensing circuit 110 may include a touch analog front-end (AFE) circuit for converting analog touch signals received from the touch sensor 93 into corresponding digital touch data, such as a set of raw touch data associated with and distributed over an area on the screen of the display panel 9 where at least one touch is detected. The touch sensing data can be further obtained based on the digital touch data, for example, by the control unit 112.

The fingerprint sensing module 12 can be utilized for being coupled to the fingerprint sensor 95 and obtaining fingerprint sensing data. For example, the fingerprint sensing module 12 may be implemented for converting fingerprint signals received from the fingerprint sensor 95 into corresponding digital fingerprint data, such as a set of raw fingerprint data associated with and distributed over an area on the screen of the display panel 9 where a fingerprint (or a portion of a fingerprint) is detected. The fingerprint sensing data can be further obtained based on the digital fingerprint data, for example, by the fingerprint sensing module 12 or the control unit 112.

The control unit 112 can be coupled to the touch sensing circuit 110 and the fingerprint sensing module 12. In an example, the control unit 112 can obtain the touch sensing data based on the digital touch data outputted by the touch sensing circuit 110.

Figure 2:
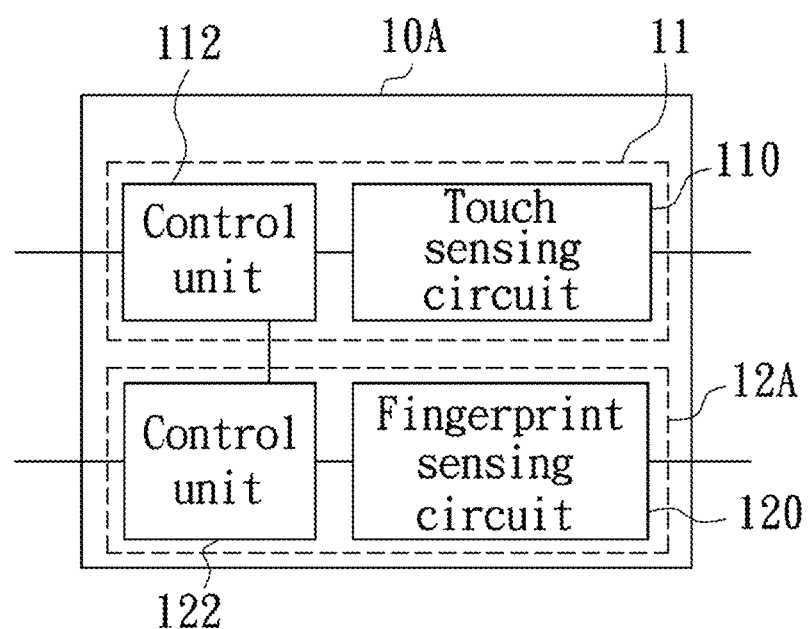
FIG. 2 is a block diagram illustrating an electronic module capable of facilitating force sensing according to another embodiment of the present disclosure.

Referring to FIG. 2, another embodiment of an electronic module capable of facilitating force sensing is illustrated in block diagram form. As shown in FIG. 2, an electronic module 10A, as an embodiment based on the electronic module 10 in FIG. 1, includes a touch sensing module 11 and a fingerprint sensing module 12A. The fingerprint sensing module 12A may include a fingerprint sensing circuit 120 and a control unit 122 for fingerprint sensing.

For example, the fingerprint sensing circuit 120 may include a fingerprint analog front-end (AFE) circuit for converting fingerprint signals received from the fingerprint sensor 95 into corresponding digital fingerprint data, such as a set of raw fingerprint data associated with and distributed over an area where a fingerprint (or a portion of a fingerprint) is detected. The fingerprint sensing data can be further obtained based on the digital fingerprint data, for example, by the control unit 122.

The control unit 122, coupled to the fingerprint sensing circuit 120 and the touch sensing module 11, can be utilized for fingerprint sensing, for example, to generate fingerprint sensing data based on the digital fingerprint data.

In the above examples, the touch sensing circuit 110 or fingerprint sensing circuit 120 may include an analog front-end circuit implemented by circuit components such as a low-noise amplifier, an analog-to-digital converter. In the above examples, the control unit 112 or 122 may be complemented by using a processor, microcontroller, or programmable circuit such as field-programmable gate array (FPGA) or application-specific integrated circuit (ASIC). In an example, the control units 112 and 122 can be implemented by using a single control unit. Certainly, the implementation of the present disclosure is not limited to the above examples.

Figure 3A:
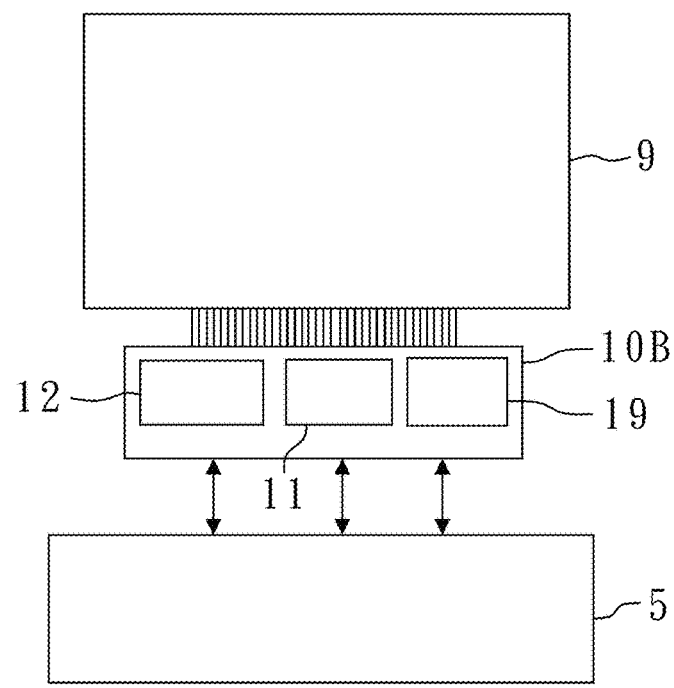
FIG. 3A is a block diagram illustrating implementation of force sensing in a computing device according to an embodiment of the present disclosure.

In an embodiment, the electronic module 10 illustrated in FIG. 1 or 2 can be implemented in a single chip, thus leading to many benefits of circuit integration to the computing device 1. FIG. 3A illustrates examples of implementation of a single chip based on the configuration of the electronic module 10 illustrated in FIG. 1 or 2, wherein an electronic module 10B, implemented in accordance with that of FIG. 1 or 2 and in a single chip form, includes a touch sensing module 11 and a fingerprint sensing module 12 (or 12A). The electronic module 10B may further include a display driving module 19 for being connected to the display module 91.

It is noted although the electronic module 10 illustrated in FIG. 1 or 2 can be implemented in a single chip, the electronic module 10, in other implementations, can be implemented using multiple chips, according to design requirements. For example, in some embodiments, the touch sensing module and the fingerprint sensing module can be implemented as different chips. In an embodiment shown in FIG. 3B, an electronic module 10C (e.g., implemented in accordance with that of FIG. 1 or 2) includes a first chip 21 and a second chip 22. The first chip 21 includes a touch sensing module 11, and the second chip 22 includes a fingerprint sensing module 12 (or 12A). The first chip 21 may further include a display driving module 19 for being connected to the display module 91 so as to drive the display module 91. Certainly, the implementation of the present disclosure is not limited to the examples.

Embodiments of a method for force sensing using information from a display panel with a touch sensor and a fingerprint sensor of a computing device will be illustrated below. Based on the method, the electronic module (e.g., 10, 10A, 10B, or 10C) as exemplified above can be configured to achieve force sensing corresponding to pressing of an object on the screen of the display panel, thus facilitating implementation of practical applications in accordance with force sensing information acquired by the method (e.g., an application program or user interface operations that uses the force sensing information).

Figure 4:
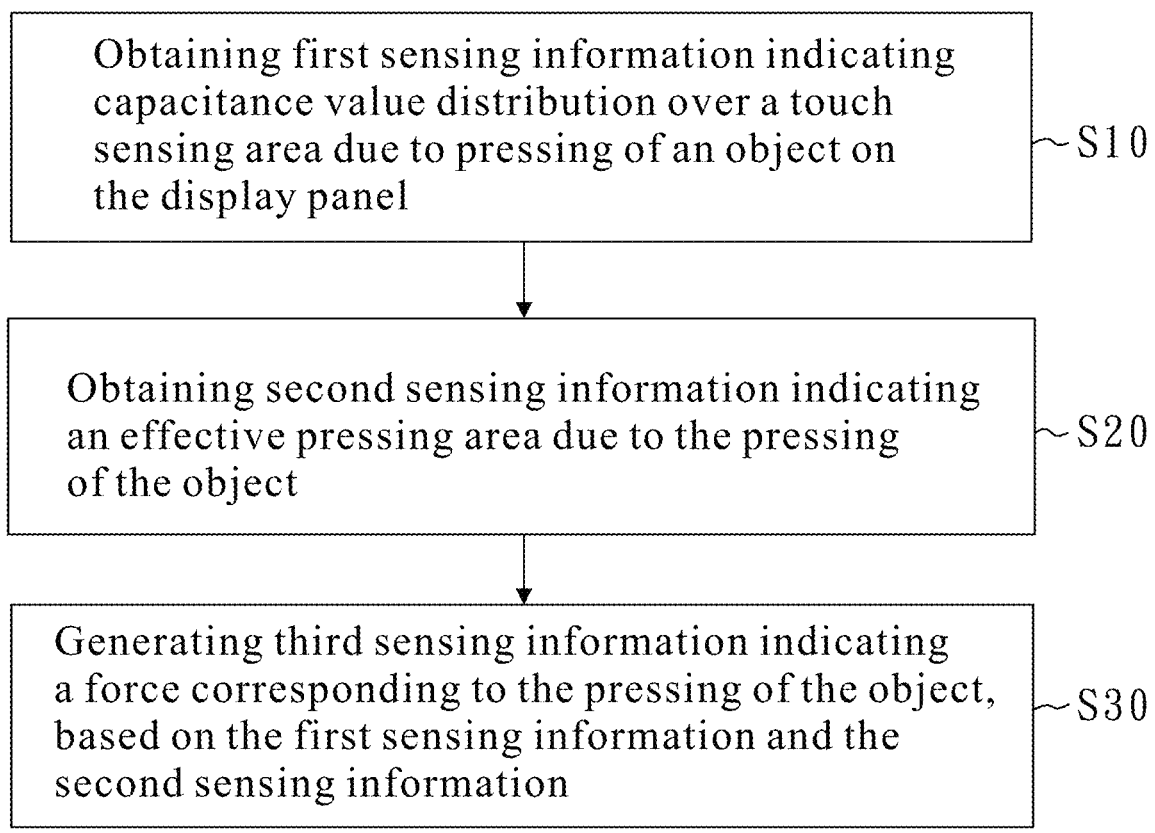
FIG. 4 is a flowchart illustrating a method for force sensing using information from a display panel with a touch sensor and a fingerprint sensor according to various embodiments.

Referring to FIG. 4, a method for force sensing using information from a display panel with a touch sensor and a fingerprint sensor of the computing device is illustrated according to an embodiment in flowchart form. The method for force sensing can be implemented in an electronic module (e.g., 10, 10A, 10B, or 10C), which is used to be coupled to a display panel, such as the display panel 9 with a touch sensor 93 and a fingerprint sensor 95. As shown in FIG. 4, the method includes the following steps, wherein the electronic module 10 (or 10A) of FIG. 1 (or FIG. 2) is referenced for the sake of illustration only and the implementation of the method is not limited thereto.

Figure 5:
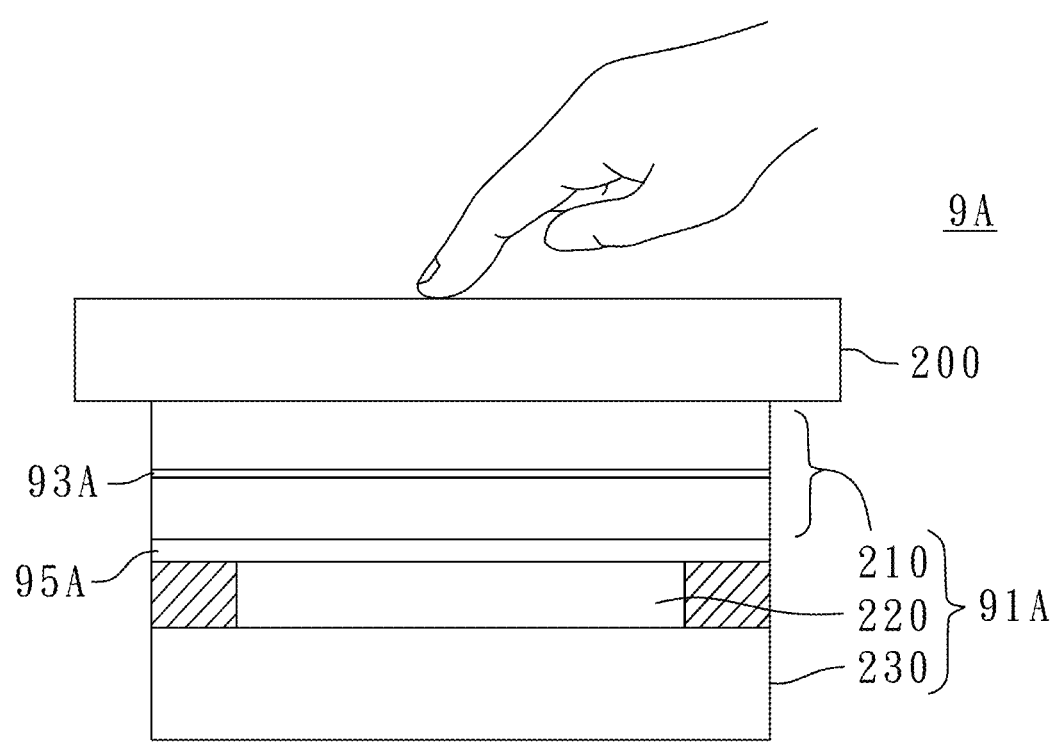
FIG. 5 is a schematic diagram illustrating a cross-sectional view of a display panel with a touch sensor and a fingerprint sensing, according to an embodiment.

As indicated by step S10, first sensing information indicating capacitance value distribution over a touch sensing area due to pressing of an object (such as one or more fingers, as illustrated in FIG. 5, or a stylus or other object) on the display panel 9 of a computing device 1 is obtained, based on touch sensing data from a touch sensing circuit 110 coupled to the touch sensor 93.

As indicated by step S20, second sensing information indicating an effective pressing area due to the pressing of the object is obtained, based on fingerprint sensing data from a fingerprint sensing circuit 120 (or fingerprint sensing module 12) coupled to the fingerprint sensor 95.

As indicated by step S30, third sensing information indicating a force corresponding to the pressing of the object is generated based on the first sensing information and the second sensing information. The step S30, for example, can be performed (e.g., alone or together) by the control unit 112 (or the fingerprint sensing module 12, or control unit 122) and/or the processing unit 5.

In some embodiments, the force calculated in step S30 is in positive correlation with an area difference between the touch sensing area and the effective pressing area. In other words, a greater force can be represented by a greater area difference between the touch sensing area and the effective pressing area; and conversely, a reduced amount of force can be represented by a reduced area difference between the touch sensing area and the effective pressing area.

In the method as shown in FIG. 4, force sensing can be achieved by the steps S10-S30 because the force corresponding to pressing of an object (such as one or more fingers, a stylus, or so on) on the display panel 9, as will be demonstrated later in the present disclosure by way of examples, is at least related to the capacitance value distribution over the touch sensing area and the effective pressing area due to the pressing of the object can be utilized as a correction in the generation of the third sensing information indicating the force. The touch sensing area, for example, indicates at least one portion or entire area which is utilized for touch sensing and provided on the display panel 9.

The following embodiments illustrate the association of a force with the pressing of an object.

First, in a situation of the pressing of an object (such as one or more fingers, a stylus, or so on), deformation of the display panel 9 can lead to internal capacitance values that vary over an area corresponding to the pressing of the object and can be measured by the touch sensor 93.

Referring to FIG. 5, a cross-sectional view of a display panel 9A (an example of the display panel 9) with a touch sensor and a fingerprint sensor is illustrated according to an embodiment. As shown in FIG. 5, the display panel 9A includes a cover glass 200, a display module 91A, a touch sensor 93A, and a fingerprint sensor 94A. The display module 91A may include a liquid crystal display (LCD) unit 210 with display cell array, a deformation layer 220 (e.g., an air gap), and a backlight unit 230. The touch sensor 93A (e.g., a capacitive touch sensor array) may be embedded in the LCD unit 210 while a fingerprint sensor 94A (e.g., an optical fingerprint sensor array) may be disposed under the LCD unit 210. As illustrated in FIG. 5, in a situation that the pressing of an object (such as one or more fingers, a stylus, or so on) on the display panel 9A applies a force on the cover glass 200, the cover glass 200 will deform downward so that the distance between the touch sensor 93A and the backlight unit 230 is reduced, resulting in an increase in capacitance between the touch sensor 93A and the backlight unit 230. Certainly, the implementation of the present disclosure is not limited to the above examples. For example, the display panel 9 with a touch sensor and a fingerprint sensor may be in any appropriate architecture, such as under-display, on-display, or in-display structure for the fingerprint sensor, or structure for embedded touch sensor, in-cell, or on-cell type touch sensor.

Figure 6:
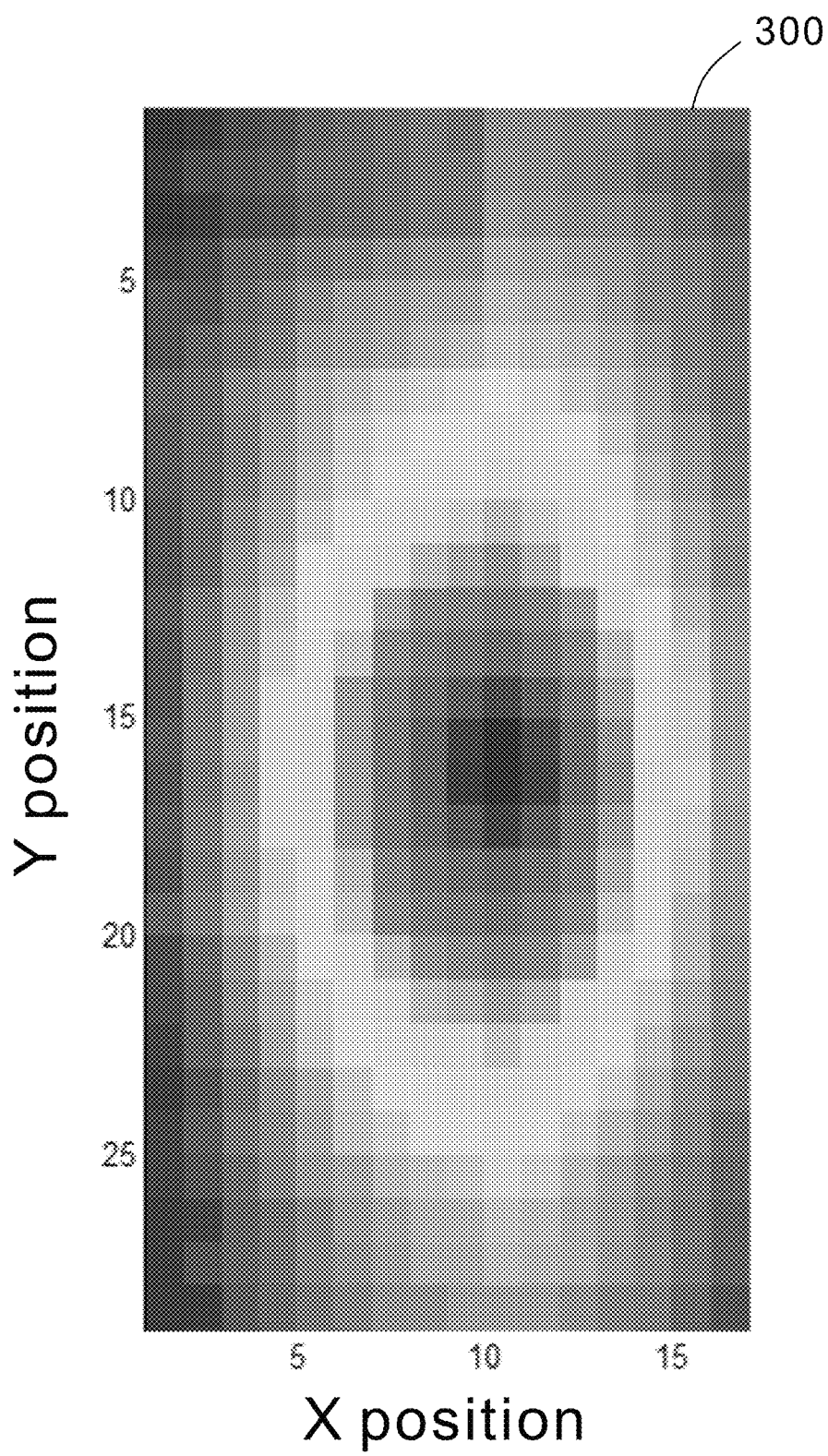
FIG. 6 is a schematic diagram illustrating an example of capacitance variation distribution over a touch sensing area due to pressing of an object on the display panel as shown in FIG. 5.
Figure 7:
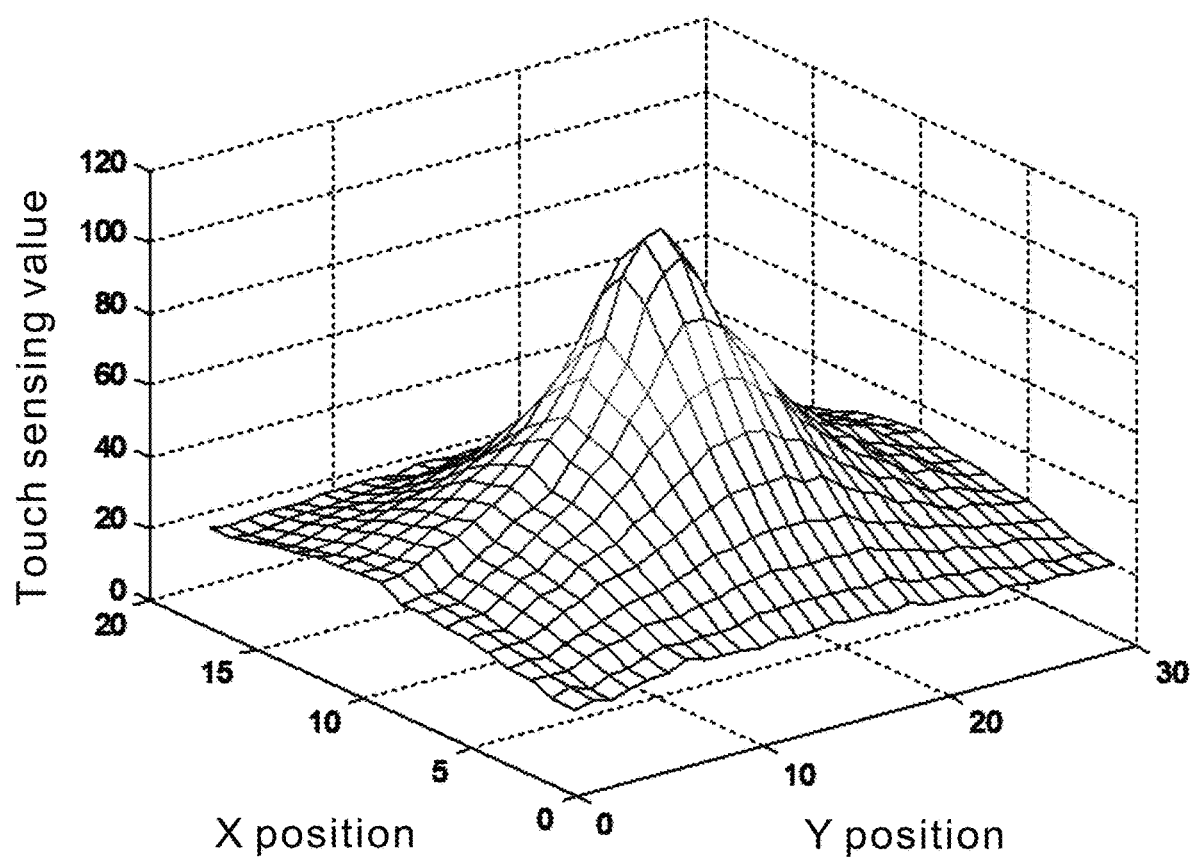
FIG. 7 is a schematic diagram illustrating the capacitance variation distribution of FIG. 6 in a three dimensional view form.

Accordingly, the deformation of the display panel 9A can lead to internal capacitance values that vary over an area corresponding to the pressing of the object and can be measured by the touch sensor 93A. FIG. 6 illustrates an example of capacitance variation distribution over a touch sensing area due to pressing of an object on the display panel as shown in FIG. 5. As shown in FIG. 6, a touch sensing area 300, which, for example, may cover substantially the same extent as that of a screen area for image display of the display panel 9, indicates an area corresponding to the touch sensor 93 (e.g., a capacitive sensor array) for the display panel 9. In FIG. 6, a plurality of small blocks are schematically illustrated in gray levels within the touch sensing area 300 to indicate an array of touch sensing elements of the touch sensor 93 corresponding to a touch sensing resolution (e.g., 16×28). When the pressing of an object occurs on the touch sensing area 300, for example, a 500 g standard weight contained in an insulated box being placed nearly in the middle of the touch sensing area 300, the corresponding capacitance variation distribution over the touch sensing area 300 can be determined and represented by using the touch sensing data that may include a plurality of touch sensing values associated with positions on the touch sensing area 300. In addition, the touch sensing value is associated with the deformation of the touch sensor 93, wherein the greater the touch sensing value is, the greater the deformation is. Referring to FIG. 7, the capacitance variation distribution of FIG. 6 is illustrated in a three dimensional view form with a z-axis for indicating a touch sensing value of a touch position (x, y). As shown in FIG. 7, a curved surface of the touch sensing values corresponding to the pressing of the object (e.g., 500 g standard weight contained in the insulated box placed in the middle of the touch sensing area 300) indicates the capacitance variation distribution in the shape like a mountain. It is noted that in FIG. 6 the small blocks in gray levels for indicating sensing values varying are shown for the sake of illustration only, rather than being displayed on the display panel 9. Certainly, the implementation of the present disclosure is not limited to the examples.

Figure 8A:
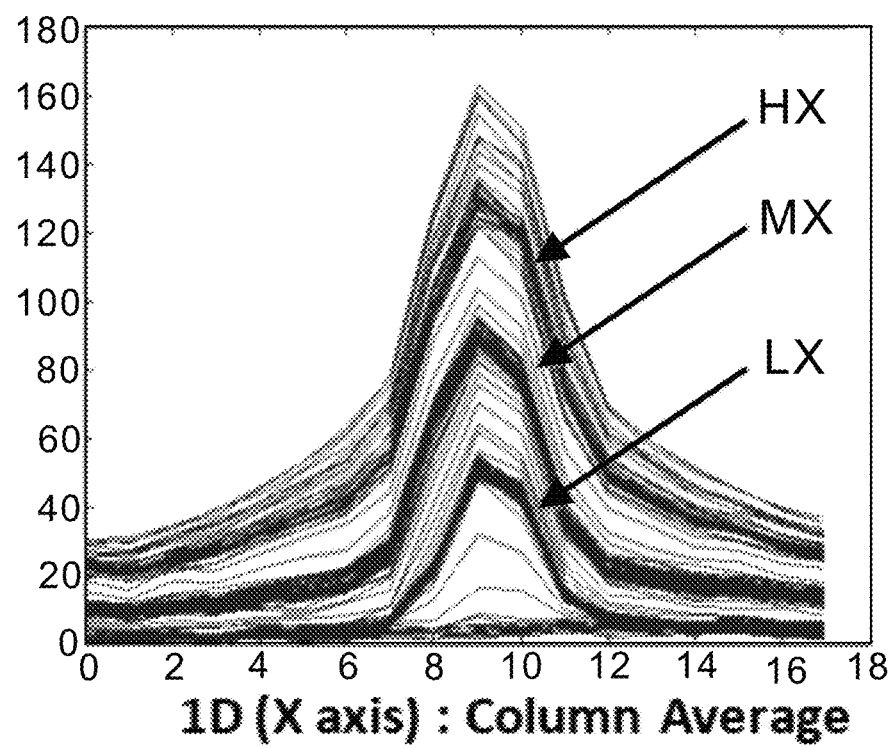
FIG. 8A is a schematic diagram illustrating the capacitance variation distribution projected onto a two dimensional plane with respect to touch sensing value and X-axis for the application of a greater force, middle force, and smaller force.
Figure 8B:
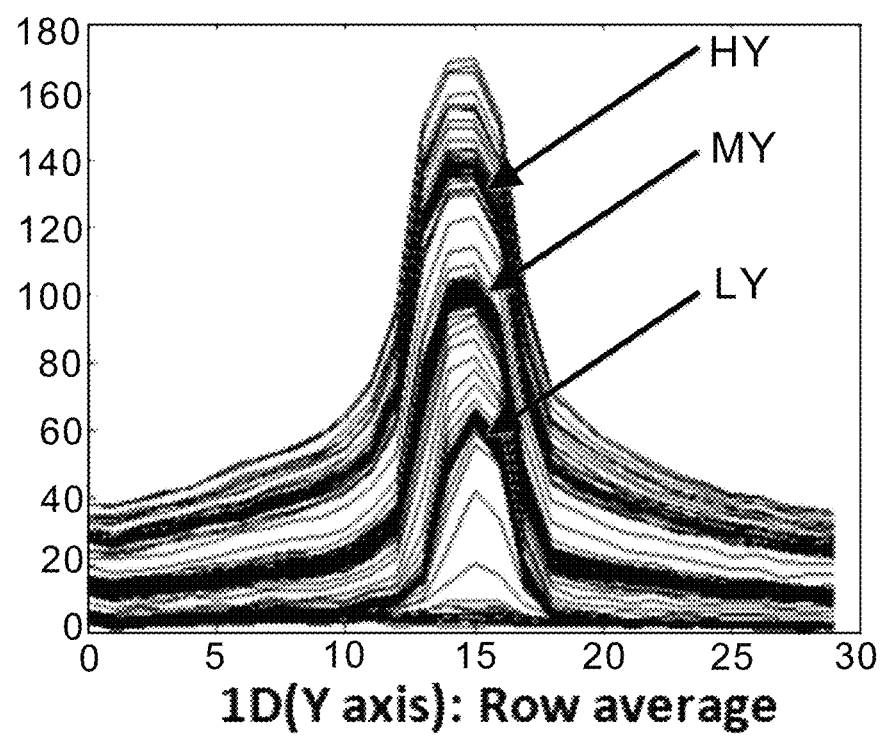
FIG. 8B is a schematic diagram illustrating the capacitance variation distribution projected onto a two dimensional plane with respect to touch sensing value and Y-axis for the application of the greater force, middle force, and smaller force.

Hence, the force applied to the display panel 9 due to the pressing of an object may lead to the capacitance variation distribution which is indicated by the touch sensing values and can be visualized in the shape like a mountain. Further, it is found that if the force applied becomes greater, the capacitance variation distribution stretches wider. Referring to FIG. 8A, curves HX, MX, LX indicate respective X-direction averages of projections of capacitance variation distributions onto a two dimensional plane with respect to Z-axis (i.e., axis for touch sensing values) and X-axis for the application of a greater force (e.g., using 2 kg standard weight), a middle force (e.g., using 1 kg standard weight), and a smaller force (e.g., using 100 g standard weight), respectively, under the same conditions of the above example of the touch sensor 93 corresponding to the touch sensing resolution (e.g., 16×28) as illustrated in FIG. 6. Referring to FIG. 8B, curves HY, MY, LY indicate respective Y-direction averages of projections of the capacitance variation distributions onto a two dimensional plane with respect to Z-axis (i.e., axis for touch sensing values) and Y-axis for the application of the greater force, middle force, and smaller force, respectively. As can be observed from FIGS. 8A and 8B, if the force applied becomes greater, the capacitance variation distribution (X-direction or Y-direction average) stretches wider.

The following provides various embodiments for implementations of steps S10, S20, and S30.

In an embodiment, in step S10, the capacitance value distribution indicates that a plurality of positions within the touch sensing area (e.g., 300) have respective capacitance values obtainable based on the touch sensing data resulting from deformation of the touch sensor (e.g., 93 or 93A) due to the pressing of the object (such as one or more fingers, a stylus, or so on).

In some embodiments, in step S20, the second sensing information is obtained by averaging fingerprint sensing values within each of a plurality of blocks over a fingerprint sensing area, based on the fingerprint sensing data, so as to obtain the second sensing information indicating the effective pressing area due to the pressing of the object.

Figure 9:
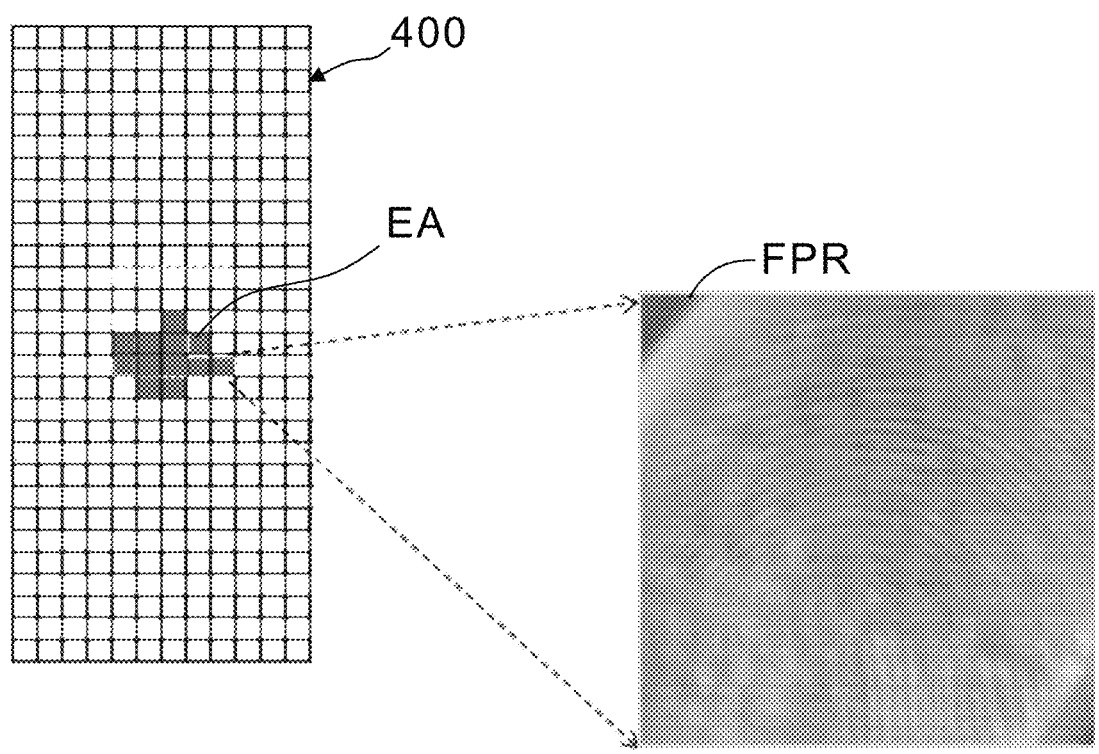
FIG. 9 is a schematic diagram illustrating an example of second sensing information indicating an effective pressing area obtained based on fingerprint sensing data.

Referring to FIG. 9, an example of second sensing information indicating an effective pressing area obtained based on fingerprint sensing data is illustrated. As shown in FIG. 9, a fingerprint sensing area 400, which, for example, may cover substantially the same extent as that of the screen area of the display panel 9 (or covering a portion of the screen area), indicates an area corresponding to the fingerprint sensor 95 (e.g., an optical fingerprint sensor array) for the display panel 9. In FIG. 9, a plurality of small blocks are schematically illustrated within the fingerprint sensing area 400 to indicate an array of fingerprint sensing elements of the touch sensor 93 corresponding to a fingerprint sensing resolution, which may be greater than or equal to the touch sensing resolution. Further, each of the blocks in the fingerprint sensing area 400 can be configured to include M×N number of fingerprint sensing elements for acquiring an image FPR (e.g., an image in gray levels), wherein M, N are integers greater than or equal to two. The corresponding fingerprint sensing values of each of a plurality of blocks over the fingerprint sensing area 400 can be averaged to obtain a corresponding representative value (e.g., an ordinary arithmetic mean, a weighted arithmetic mean, or so on) for the block. In FIG. 9, for example, some blocks, as illustrated in black, indicate that an image of an object (e.g., a fingerprint) is acquired by the corresponding fingerprint sensing elements of the blocks. Hence, an effective pressing area EA, which corresponds to the image of the object contacting the display panel 9, can be determined using these blocks. Further, it is noted that although the fingerprint image is taken as an example in FIG. 9, the image acquired may be one or more fingers, or a stylus or other object.

The method based on FIG. 4 can achieve force sensing with the contribution of the effective pressing area (e.g., EA in FIG. 9), which is obtained from the fingerprint sensing data and can be utilized in the generation of the third sensing information.

In this regard, an issue is concerned that similar capacitance value distributions (e.g., FIG. 10 and FIG. 11) may be caused by the pressing of different objects with different forces applied, making it challenging to realize force sensing by using the capacitance value distributions. As will be shown below, the method based on FIG. 4 utilizes the second sensing information indicating an effective pressing area to recognize possible contact positions which correspond to the pressing of the object, thus facilitating force sensing and overcoming the issue.

Figure 10:
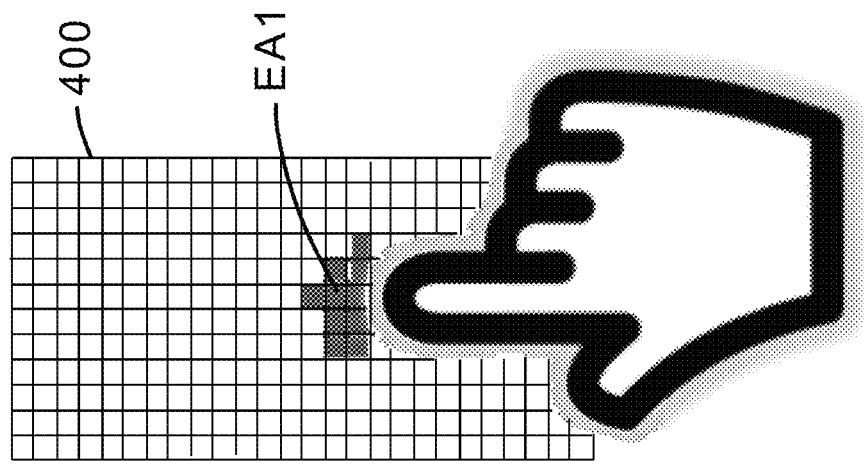
FIG. 10 is a schematic diagram illustrating an example of first sensing information and second sensing information corresponding to a finger pressing the display panel with a greater force.
Figure 10:
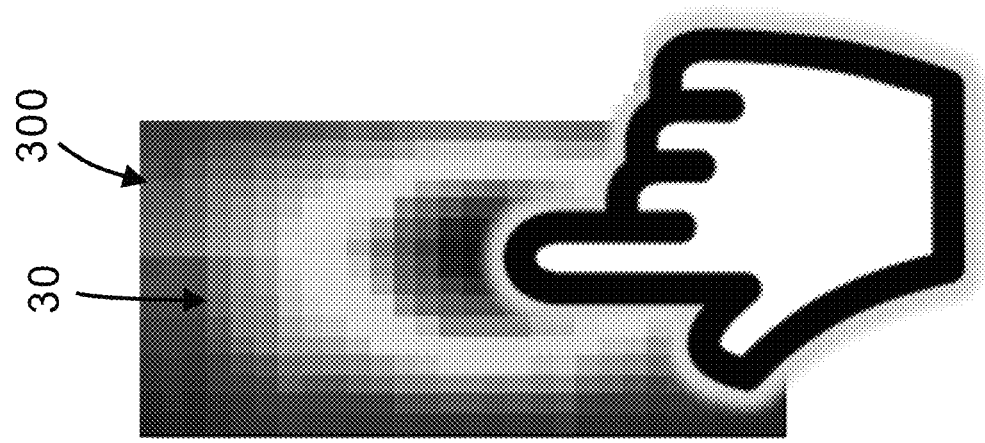
Figure 11:
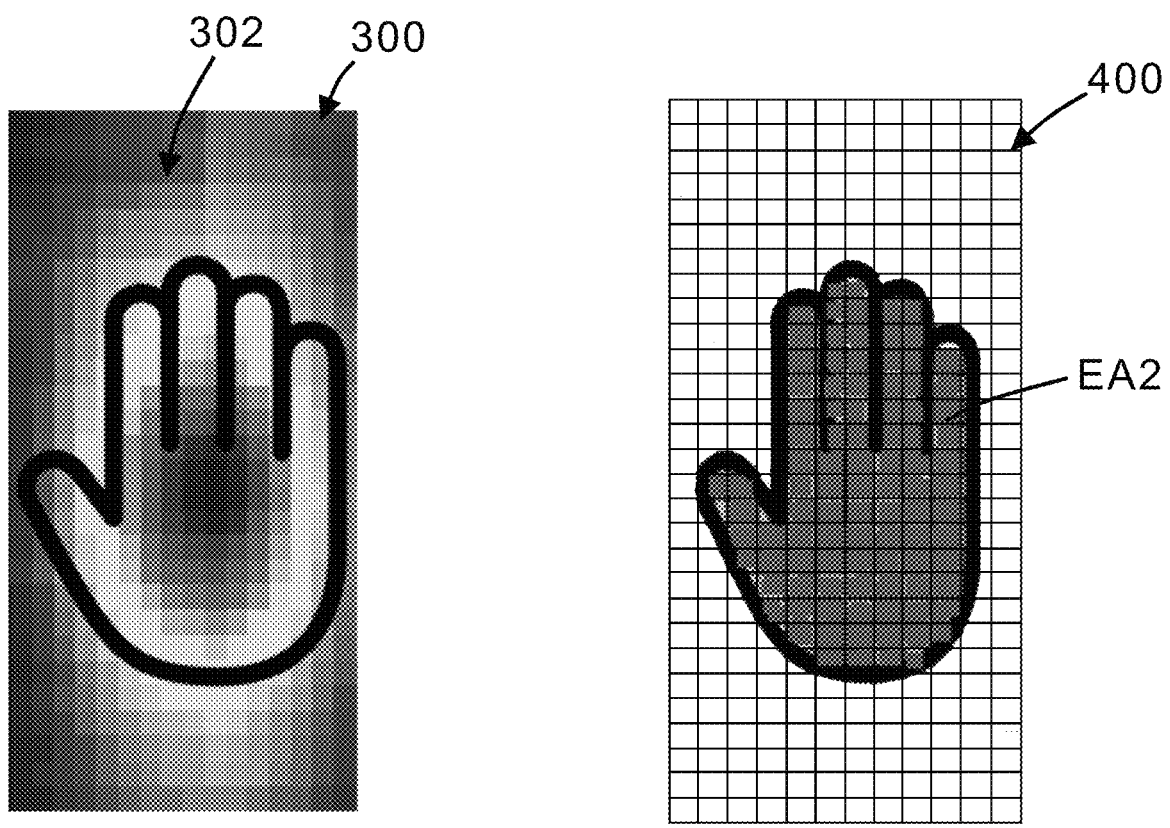
FIG. 11 is a schematic diagram illustrating an example of first sensing information and second sensing information corresponding to a palm pressing the display panel with a smaller force.

FIGS. 10 and 11 demonstrate the above issue. Referring to FIG. 10, an example of first sensing information and second sensing information corresponding to a finger pressing the display panel with a greater force is illustrated. As shown on the left side of FIG. 10, first sensing information indicating capacitance value distribution is represented by a map 301, over the touch sensing area 300 due to heavy pressing of an object (e.g., a finger) on the display panel 9, wherein the first sensing information can include touch sensing values associated with corresponding positions (e.g., coordinates for the blocks for touch sensing). As shown on the right side of FIG. 10, second sensing information indicating an effective pressing area is represented by EA1, due to the heavy pressing of the object (e.g., a finger) over the fingerprint sensing area 400 on the display panel 9, wherein the second sensing information can include fingerprint sensing values associated with corresponding positions (e.g., X, Y coordinates for the blocks or the fingerprint sensing elements for fingerprint sensing). By contrast with FIG. 10, another example of first sensing information and second sensing information corresponding to a palm touching the display panel with a smaller force is illustrated in FIG. 11. As shown on the left side of FIG. 11, first sensing information indicating capacitance value distribution is represented by a map 302, over the touch sensing area 300 due to light pressing of an object (e.g., a palm) on the display panel 9. As shown on the right side of FIG. 11, second sensing information indicating an effective pressing area is represented by EA2, due to the light pressing of the object (e.g., a palm) over the fingerprint sensing area 400 on the display panel 9 is illustrated.

As compared with FIG. 10, the capacitance value distributions (e.g., FIG. 10 and FIG. 11) represented by the maps 301 and 302 are similar while the force associated with the heavy pressing of the finger is greater than that associated with the light pressing of the palm. Meanwhile, as illustrated in FIG. 10 or 11, the effective pressing area EA1 for heavy pressing (pressing with the greater force) is smaller than the effective pressing area EA2 for the light pressing (pressing with the smaller force), wherein the effective pressing area EA1 or EA2 is within and smaller than the touch sensing area 300. Hence, in the method based on FIG. 4, the second sensing information indicating an effective pressing area can be utilized to recognize possible contact positions on the touch sensing area which correspond to the pressing of the object, and can be employed or viewed as a correction to the first sensing information for the above issue in the generation of the third sensing information indicating force information.

Accordingly, in some embodiments, the force calculated in step S30 can be designed to have a positive correlation with an area difference between the touch sensing area and the effective pressing area. In other words, a greater force can be represented by a greater area difference between the touch sensing area and the effective pressing area, as exemplarily shown in FIG. 10; and conversely, a reduced amount of force can be represented by a reduced area difference between the touch sensing area and the effective pressing area, as exemplarily shown in FIG. 11.

In this regard, for example, the third sensing information can be generated based on a difference value (DV), as conceptually expressed by the below equation:

$$DV = T\_SA - FP\_EA \qquad \text{(equation 1)}$$

wherein T_SA denotes a value indicating the touch sensing area and FP_EA denotes a value indicating the effective pressing area. In an example, T_SA can be defined as a first weighted sum of touch sensing values (T_SA$_i$) of the first sensing information and FP_EA can be defined as a second weighted sum of fingerprint sensing values (FP_EA$_j$) of the second sensing information. By using these definitions, the difference value (DV) of the equation 1 can be expressed as follows:

$$DV = \sum_i a_i \cdot \text{T\_SA}_i - \sum_j b_j \cdot \text{FP\_EA}_j \qquad \text{(equation 2)}$$

wherein the weight(s) $a_i$ for the first weighted sum and the weight(s) $b_j$ for the second weighted sum can be set in an appropriate manner, for example, the weights $a_i$ being positive values, so that the first weighted sum contributes to the difference value DV more than the second weighted sum does (e.g., T_SA>FP_EA), thus fulfilling that the touch sensing values that do not correspond to the effective pressing area dominate the results of the computation for the third sensing information. In another example, T_SA (e.g., the first weighted sum) can be conceptually equal to the sum of the weighted sum (indicated by T_XEA) of the touch sensing values that do not correspond to the effective pressing area and the weighted sum (indicated by T_EA) of the touch sensing values that do correspond to the effective pressing area, and the equation 2 can be expressed as below.

$$DV = T\_XEA + T\_EA - FP\_EA \qquad \text{(equation 3)}$$

For example of the equation 3, $FP\_EA = \sum_j b_4 \cdot FP\_EA_j$ wherein the weight(s) $b_j$ for the second weighted sum can be set in an appropriate manner, for example, the weights $b_j$ being non-negative values, so that the first weighted sum contributes to the difference value DV more than the second weighted sum does. For example, the weight(s) $b_j$ can be set so that T_XEA>T_EA−FP_EA; or even T_EA is substantially equal to FP_EA, Certainly, the implementation of the present disclosure is not limited to the examples.

The following embodiments related to generation of the third sensing information indicating a force in step S30.

In some embodiments of step S30, the third sensing information is generated by performing computation at least based on a first weighted sum of touch sensing values of the first sensing information not corresponding to the effective pressing area (e.g., the area outside the area EA1 or EA2), and the contribution of the touch sensing values that correspond to the effective pressing area (e.g., EA1 or EA2) is reduced in the computation. In this manner, the computation can be determined or configured to be more accurate, wherein the effective pressing area can be employed as a correction in the computation for the above issue, as illustrated by way of FIGS. 10 and 11.

Further, in the embodiments of step S30, for the reduction of the contribution of the touch sensing values that correspond to the effective pressing area (e.g., EA1 or EA2) in the computation, various approaches can be provided.

Figure 12:
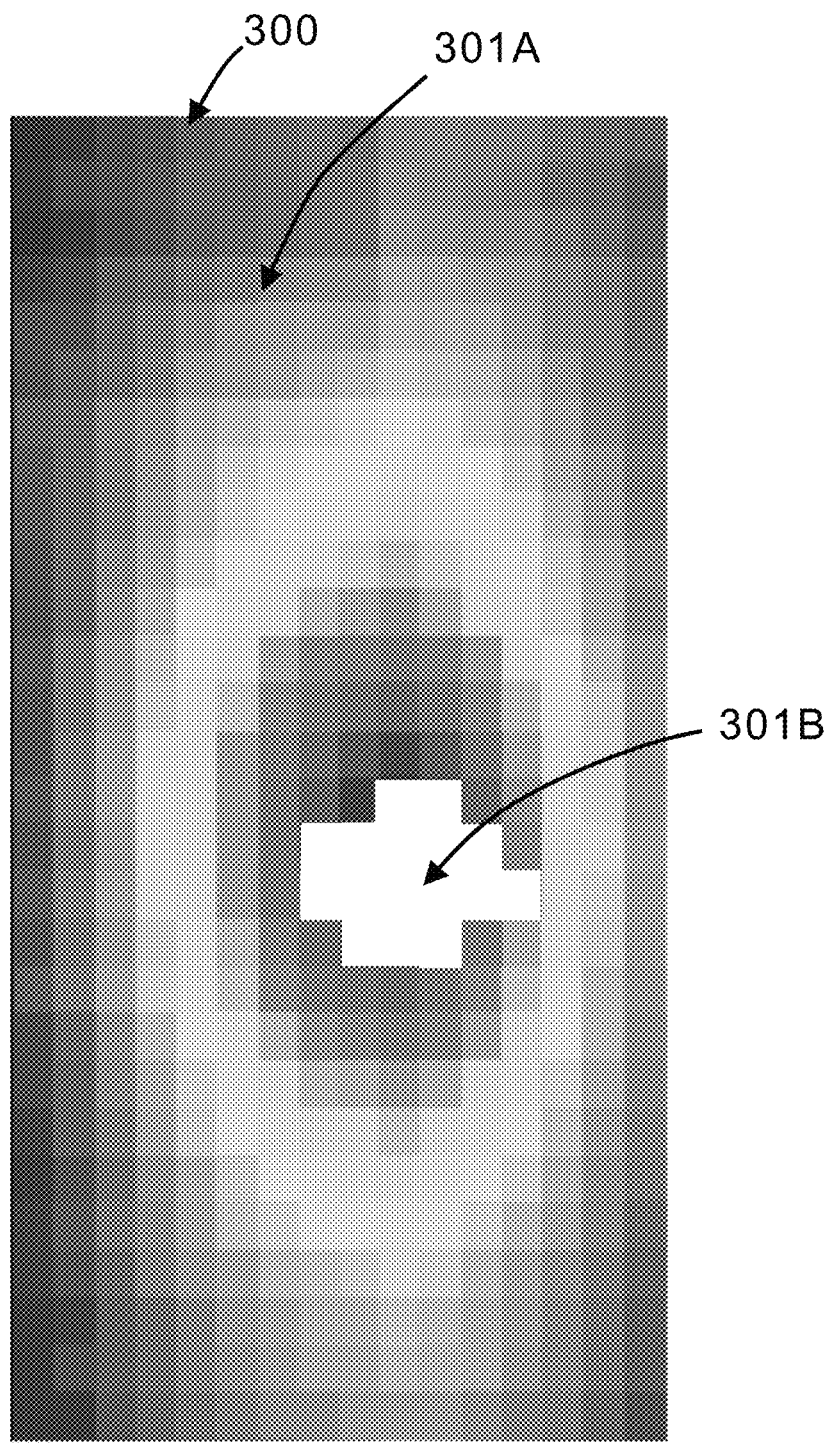
FIG. 12 is a schematic diagram illustrating an example of generating third sensing information indicating a force corresponding to the pressing of a finger.

In an embodiment for the contribution of the touch sensing values that correspond to the effective pressing area (e.g., EA1 or EA2) in the computation of step S30, any of the touch sensing values that correspond to the effective pressing area can be totally excluded from the computation. In this regard, referring to FIG. 12, an example of generating third sensing information indicating a force corresponding to the pressing is illustrated. For the sake of illustration, the example illustrated in FIG. 12 is taken under the case of FIG. 10 where it is supposed that a user presses one's finger on the screen of the display panel 9. Following this case of FIG. 10, the computation for generating the third sensing information can be performed at least based on a first weighted sum of touch sensing values of the first sensing information which do not correspond to the effective pressing area, as indicated in FIG. 12 by a sub-map 301A obtained by excluding (e.g., totally, or partially) the touch sensing values that correspond to the effective pressing area (e.g., EA1), as indicated in FIG. 12 by a blank area 301B surrounded by the sub-map 301A. Following the case of FIG. 11 in which the user presses one's palm on the screen of the display panel 9, the computation for generating the third sensing information can be performed at least based on a first weighted sum of touch sensing values of the first sensing information which do not correspond to the effective pressing area, as indicated in FIG. 13 by a sub-map 302A obtained by excluding (e.g., totally, or partially) the touch sensing values that correspond to the effective pressing area (e.g., EA2), as indicated in FIG. 13 by a blank area 302B surrounded by the sub-map 302A.

Figure 13:
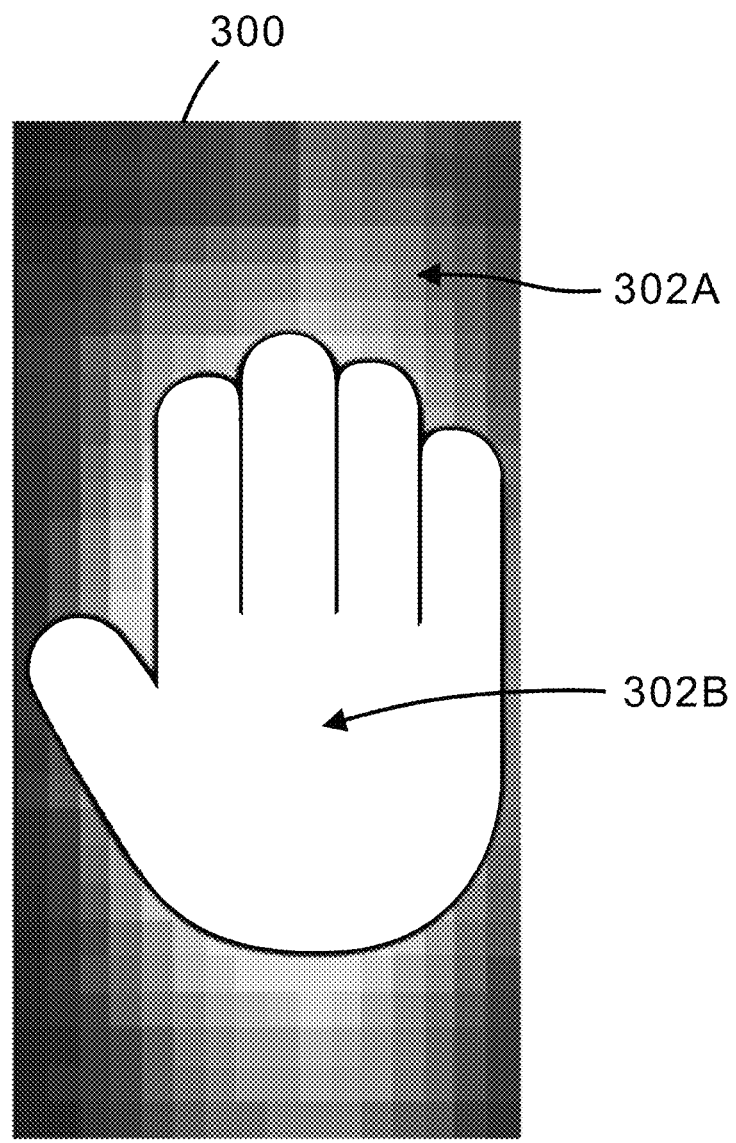
FIG. 13 is a schematic diagram illustrating an example of generating the third sensing information indicating a force corresponding to the pressing of a palm.

Further, as illustrated in FIGS. 12 and 13, the sub-map 301A corresponding to a greater force (e.g., by a finger) is greater than the sub-map 302A corresponding to a smaller force (e.g., by a palm) so that the force indicated by the third sensing information which is associated with the sub-map 301A can be determined to be greater than that indicated by the third sensing information which is associated with the sub-map 302A, thus resulting in reasonable and consistent force information predictions for both examples of FIGS. 12 and 13.

In another embodiment for the contribution of the touch sensing values that correspond to the effective pressing area (e.g., EA1 or EA2) in the computation of step S30, the touch sensing values that correspond to the effective pressing area is not totally excluded from the computation. For example, when the touch sensing values that correspond to the effective pressing area is not totally excluded from the computation, the computation for generating the third sensing information can be performed at least based on a first weighted sum of touch sensing values of the first sensing information which do not correspond to the effective pressing area (e.g., as indicated by the sub-map 301A in FIG. 12, or the sub-map 302A in FIG. 13) and based on a portion or some of the touch sensing values that correspond to the effective pressing area (e.g., EA1 or EA2).

In an embodiment, the third sensing information can be generated by performing the computation additionally based on a second weighted sum of fingerprint sensing values of the second sensing information, wherein the touch sensing values that do not correspond to the effective pressing area dominate the results of the computation. In this manner, more accurate force information indicated by third sensing information can be obtained.

In this regard, for example, the third sensing information can be generated based on a summation value (SV), as expressed by the below equation:

$$SV = \sum_i a_i \cdot \text{T\_XEA}_i - \sum_j b_j \cdot \text{FP\_EA}_j \qquad \text{(equation 4)}$$

wherein a first weighted sum of touch sensing values ($\text{T\_XEA}_i$) of the first sensing information not corresponding to the effective pressing area (e.g., EA1) can by denoted by $\sum_i a_i \cdot \text{T\_XEA}_i$ and a second weighted sum of fingerprint sensing values ($\text{FP\_EA}_j$) of the second sensing information can be denoted by $\sum_j b_j \cdot \text{FP\_EA}_j$. The weight(s) $a_i$ for the first weighted sum can be set in an appropriate manner (e.g., in greater values or positive as compared with the weight(s) $b_j$ for the second weighted sum) so that the first weighted sum contributes to the summation value SV more than the second weighted sum does, thus fulfilling that the touch sensing values that do not correspond to the effective pressing area dominate the results of the computation. For example, the weight(s) $b_j$ for the second weighted sum can be set to be in smaller values or negative, as compared with the weight(s) $a_i$ for the first weighted sum so that the second weighted sum contributes less to the summation value SV.

Certainly, the implementation of the present disclosure is not limited to the above examples. In some embodiments, the third sensing information can be generated based on a summation value SV as expressed by another equation below:

$$SV = f(T\_XEA_i) + g(FP\_EA_j), \quad \text{(equation 5)}$$

wherein f( ) and g( ) denote any appropriate functions. For example, f( ) can be selected so that $f(T\_XEA_i)$ contributes more to the summation value SV than $g(FP\_EA_j)$ does, thus fulfilling that the touch sensing values that do not correspond to the effective pressing area dominate the results of the computation.

In some embodiments, the third sensing information indicating the force information, for example, can be determined by computation which is derived by way of a statistical approach (e.g., linear or non-linear) or a machine learning approach (e.g., a neural network, convolution neural network, or so on), whenever appropriate, based on touch sensing values of the first sensing information and fingerprint sensing values of the second sensing information as input values and corresponding force information (e.g., in values) as output values. For example, the computation can be implemented by a trained model obtained by way of machine learning.

In practical implementation, any one of the above embodiments about the computation in step S30, whenever appropriate, can be implemented by a lookup table so as to simplify the computation complexity of the electronic module (e.g., 10, 10A, 10B, or 10C).

In some implementations of a computing device using the electronic module as exemplified in the disclosure, additional force correction can be implemented to reduce the effects on the determination of force information because of gravity that may cause the computing device's mechanism to bend or mass production variations. In this regard, after the assembly of the computing device is completed, the additional force correction can be performed to achieve the first-order or multiple-order force information determination, and even the information of force in grams, for example, by way of additional table lookup or computation.

Figure 14:
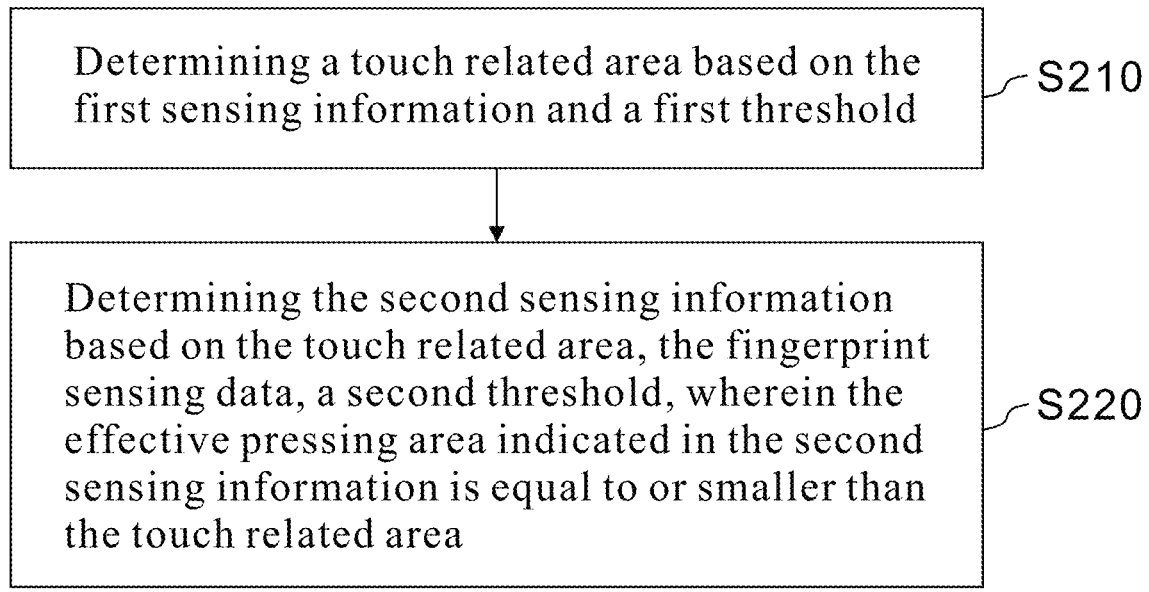
FIG. 14 is a flowchart illustrating another embodiment of generating the second sensing information.

In some embodiments, the effective pressing area indicating by the second sensing information can be obtained in an efficient manner by using the touch sensing values of the touch sensing area. For example, the step S20 of obtaining the second sensing information can include steps S210 and S220, as illustrated in FIG. 14.

As shown in step S210, a touch related area is determined based on the first sensing information and a first threshold.

As shown in step S220, the second sensing information is determined based on the touch related area, the fingerprint sensing data, a second threshold, wherein the effective pressing area indicated in the second sensing information is equal to or smaller than the touch related area.

In an embodiment of step S210, the touch related area is determined in which each of touch sensing values of the touch related area exceeds or equals the first threshold. For example, the control unit (e.g., 112 or 122) can be configured to check whether the touch sensing values described by the first sensing information in the touch sensing area (e.g., 300) exceed or equal the first threshold and the control unit (e.g., 112 or 122) can be configured to determine the touch sensing values exceed or equal the first threshold as the touch related area (e.g., 310, as shown in FIG. 13). In this way, the touch related area (e.g., 310) may be smaller than the touch sensing area (e.g., 300) in data blocks, thus reducing data amount that needs to be processed in the subsequent process (e.g., step S30).

In an embodiment of step S220, the second sensing information is determined in which each of fingerprint sensing values of the effective pressing area exceeds or equals the second threshold. Referring to FIG. 13, for example, the control unit (e.g., 112 or 122) can be configured to determine a corresponding area (e.g. 410) within the fingerprint sensing area 400 by using the touch related area 310. The fingerprint sensing module (e.g., 12) can be configured to perform fingerprint scanning (i.e., image scanning) for an object (e.g., a finger) with respect to the corresponding area (e.g., 410) and check whether the fingerprint sensing values described by the fingerprint sensing data in the corresponding area (e.g., 410) exceed or equal the second threshold. The control unit (e.g., 112 or 122) can be configured to determine the fingerprint sensing values that exceed or equal the second threshold as the effective touch area (e.g., EA1, as shown in FIG. 13). As can be observed from FIG. 13, the first threshold can be set to an appropriate value such that the touch related area 310 approaches to the actual area in contact with the object (e.g., the finger), making the corresponding area (e.g., 410) smaller and facilitating the fingerprint sensing module (e.g., 12) determining the effective touch area (e.g., EA1) in a more effective and efficient manner.

In addition, the second sensing information indicating an effective pressing area (e.g., EA1) can be utilized to recognize possible contact positions which correspond to the pressing of the object (e.g., a finger). Referring to FIG. 14, for example, a portion 311 of the touch sensing values that exceed the first threshold but has its corresponding portion 411 with respect to the fingerprint sensing area 400 not within the effective pressing area EA1 indicates that the portion 311 of the touch sensing values is caused due to deformation by the force. Hence, the portion 311 of the touch sensing values should be used in the determination of the force information.

One or more of the above embodiments and examples of step S20 can be utilized in any of the embodiments or examples of step S30 for determination of the force information.

In a scenario of practical application for a computing device 1, such as smart phone or tablet computer, based on FIG. 1, force information corresponding to pressing of an object (such as one or more fingers or a stylus by a user) can be determined based on the third sensing information generated in accordance with the method of FIG. 4. For example, the computing device 1 (e.g., smart phone, tablet computer, and so on) can be configured to perform one of operations (e.g., user operation or function in a game) associated with different values of force indicated by the third sensing information generated by the electronic module 10. For example, in a game application with gun shooting, the user can perform both focusing a target and shooting a gun on the screen by touching the screen with a greater force or only focusing a target by touching the screen with a smaller force. In another example, in a piano playing application displaying a piano keyboard, the user can perform the music with touch response effects; that is, the greater the user hits the key, the louder the music note associated with the key will play. Certainly, the implementation of the disclosure is not limited to the examples.

In an embodiment, the fingerprint sensing is performed after user identification recognition is completed (i.e., a user has been authenticated) or which even can be irrelevant to user identification recognition. In other words, the fingerprint sensing data can be used to contribute to generating of force information. For example, the fingerprint sensing data obtained in step S20 can be utilized in step S30 for force sensing implemented in the electronic module (e.g., 10, 10A, 10B, or 10C) internally while the processing unit 5 does not require the electronic module (e.g., 10, 10A, 10B, or 10C) to provide output fingerprint data for user identification recognition. This may occur after the computing device 1 has been unlocked such that a user is authorized to operate the computing device 1.

In some embodiments of the method of FIG. 5, step S20 can be configured to be performed only when at least one criterion is satisfied. In one of the embodiments, the method further includes requesting the fingerprint sensing data from the fingerprint sensing module 12 when the touch sensing data indicates a touch event. For example, the control unit 112 can send a request to the fingerprint sensing module 12 for the fingerprint sensing data when the touch sensing data indicates a touch event. Conversely, when the touch sensing data does not indicate a touch event, the control unit 112 cannot send the request to the fingerprint sensing module 12. In this manner, the fingerprint sensing data can be utilized to enhance the generation of force information, more efficiently and effectively. In some embodiments, the method further includes determining that the touch sensing data indicates the touch event when the touch sensing data exceeds a threshold value. For example, it is supposed that the touch sensing data indicates a plurality of touch sensing values associated with positions in an area where a touch is detected, the touch sensing data can be represented by an average of the touch sensing values and the control unit 112 can determine that the touch sensing data indicates the touch event when the average of the touch sensing values exceeds a corresponding threshold value. In another example, the control unit 112 can determine that the touch sensing data indicates a touch event when one or more of the touch sensing values exceeds a threshold value.

As such, the process as shown in FIG. 9 can be employed in a scenario of practical application for a computing device 1, such as smart phone, based on FIG. 1, force information associated with multi-touch points by a user (or multiple users) can be determined accurately based on the touch sensing data and the fingerprint sensing data.

Figure 3B:
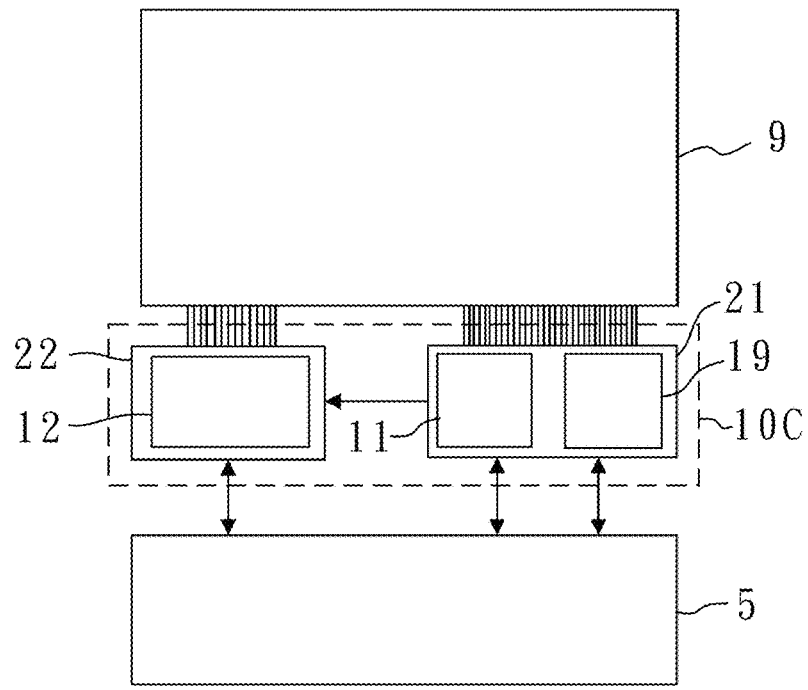
FIG. 3B is a block diagram illustrating implementation of force sensing in a computing device according to another embodiment of the present disclosure.

Further, the electronic module (e.g. in a single chip form) capable of facilitating force sensing as exemplified above can be integrated with a display driving module. Referring to FIG. 3A or 3B, the electronic module can be based on FIG. 1 or 2 and further includes a display driving module 19, which is coupled to the touch sensing module 11 and the fingerprint sensing module 12 internally in the electronic module; and the display driving module 19 is utilized for being coupled to the display module 91 of the display panel 9 for driving the display module 91 to display images. In an embodiment for the display panel 9 with a fingerprint sensor 95 which is an optical fingerprint scanner, for example, when a touch event is detected by the touch sensing module 11, the touch sensing module 11 can inform the display driving module 19 of an area that the touch event occurs. In some implementations, the display driving module 19 may drive the display module 91 to emit light or an image pattern for exposure of the area. In the meantime, the touch sensing module 11 can inform the fingerprint sensing module 12 for activating the fingerprint sensing elements (e.g., optical sensing elements) corresponding to the area for fingerprint detection so as to obtain fingerprint sensing data. The fingerprint sensing data can be utilized internally in the electronic module in accordance with the method based on FIG. 4 as exemplified in one of the above embodiments. Certainly, the implementation of the present disclosure is not limited to the above examples. It is also noted that different implementations may be made to integrate or separate the different modules as one or more circuits. For example, the display driving module and the touch sensing module can be integrated as a circuit, and the fingerprint sensing module can be implemented as another circuit which can be further totally or partially separated from or integrated with the circuit of the display driving module and the touch sensing module.

In some embodiments, a computing apparatus (or computing device) comprising a display panel, first means, second means, and third means is provided. The display panel is provided with a touch sensor and a fingerprint sensor (e.g., as shown in FIG. 1). The first means, coupled to the touch sensor, is used for obtaining first sensing information indicating capacitance value distribution over a touch sensing area due to pressing of an object on the display panel. The second means, coupled to the fingerprint sensor, is used for obtaining second sensing information indicating an effective pressing area due to the pressing of the object. The third means, coupled to the first means and second means, is used for generating third sensing information indicating a force corresponding to the pressing of the object, based on the first sensing information and the second sensing information. The computing apparatus (e.g., 1) is capable of performing at least one of operations selectively based on the third sensing information.

In an embodiment of the computing device, the capacitance value distribution (e.g., as shown in FIG. 6, 7, 8A or 8B) indicates that a plurality of positions within the touch sensing area have respective capacitance values resulting from deformation of the touch sensor due to the pressing of the object.

In an embodiment of the computing device, the second means is configured to average fingerprint sensing values within each of a plurality of blocks over a fingerprint sensing area so as to obtain the second sensing information indicating the effective pressing area due to the pressing of the object.

Figure 15:
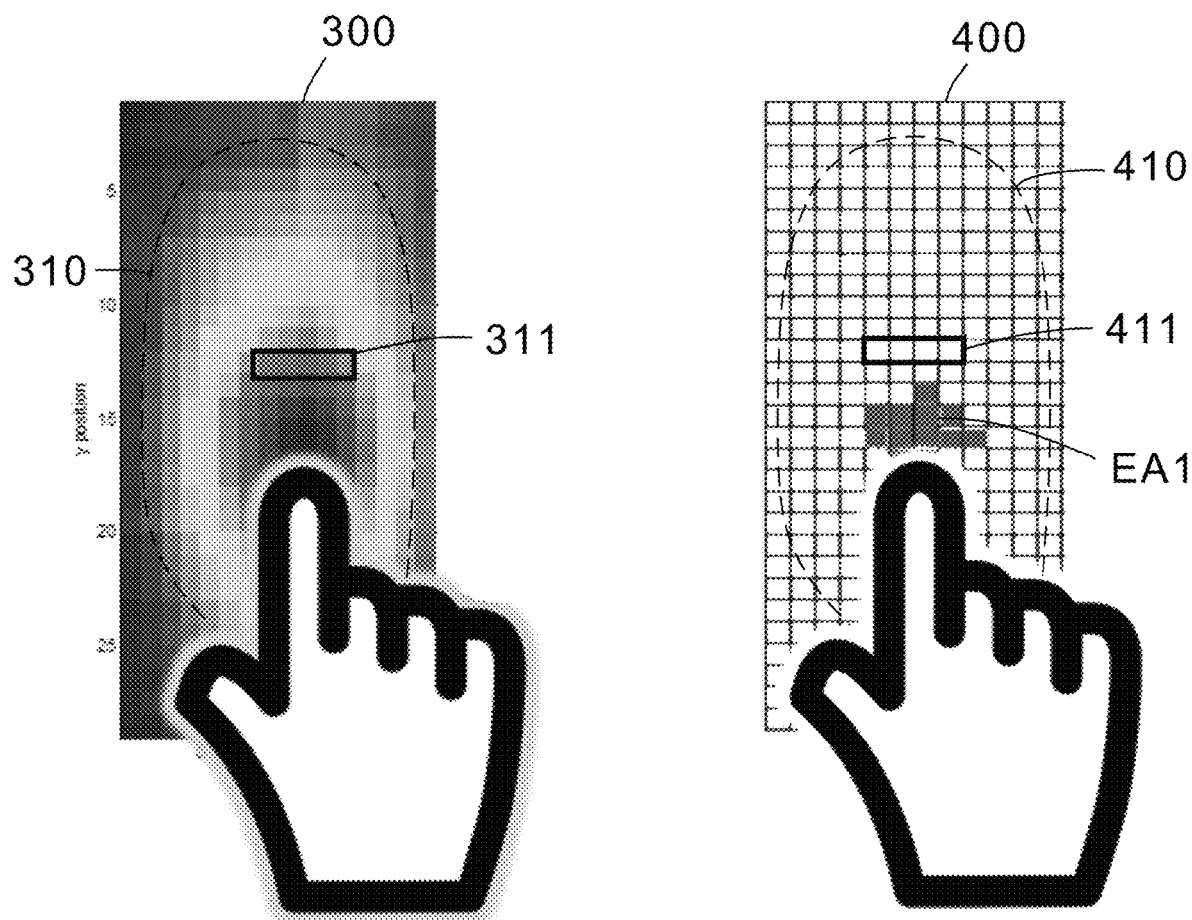
FIG. 15 is a schematic diagram illustrating an example of generating the second sensing information indicating an effective pressing area.

In an embodiment of the computing device, the second means determines a touch related area based on the first sensing information and a first threshold; and the second means determines the second sensing information based on the touch related area, the fingerprint sensing data, a second threshold, wherein the effective pressing area indicated in the second sensing information is equal to or smaller than the touch related area (e.g., as illustrated in embodiments related to FIG. 15).

In an embodiment of the computing device, the second means determines the touch related area in which each of touch sensing values of the touch related area exceeds or equals the first threshold.

In an embodiment of the computing device, the second means determines the second sensing information in which each of fingerprint sensing values of the effective pressing area exceeds or equals the second threshold.

In some embodiments of the computing device, the third means (e.g., 112 or 122 as shown in FIG. 1 or 2) performs computation at least based on a first weighted sum of touch sensing values of the first sensing information not corresponding to the effective pressing area, and the contribution of the touch sensing values that correspond to the effective pressing area is reduced in the computation.

In an embodiment of the computing device, any of the touch sensing values that correspond to the effective pressing area is totally excluded from the computation so as to generate the third sensing information (e.g., as illustrated in the embodiments related to FIG. 12 or 13).

In an embodiment of the computing device, the touch sensing values that correspond to the effective pressing area is not totally excluded from the computation (e.g., as illustrated in the embodiments related to step S30).

In an embodiment of the computing device, the third means performs the computation additionally based on a second weighted sum of fingerprint sensing values of the second sensing information so as to generate the third sensing information, wherein the touch sensing values that do not correspond to the effective pressing area dominate the results of the computation (e.g., as illustrated in the embodiments related to step S30).

In an embodiment of the computing device, the computing apparatus further comprises: a single chip and a processing unit (e.g., 5 as shown in FIG. 1). The single chip (e.g., 10B illustrated in FIG. 3A) includes the first means, the second means, and third means. The processing unit (e.g., 5 as shown in FIG. 1), coupled between the display panel (e.g., 9 as shown in FIG. 1) and the single chip (e.g., 10B illustrated in FIG. 3A), is configured to perform the at least one of operations selectively based on the third sensing information.

In an embodiment of the computing device, the computing apparatus further comprises a single chip (e.g., illustrated in FIG. 1 or 2) which includes the first means and the second means, wherein the third means is a processing unit (e.g., 5) coupled between the display panel (e.g., 9) and the single chip, and the processing unit is configured to perform the at least one of operations selectively based on the third sensing information.

This embodiment may not need redesign of a mechanical structure of and electronic circuitry for the panel module to have an additional force sensor, thus capable of reducing the volume of the computing device and hardware and manufacturing costs.

While the present disclosure has been described by means of specific embodiments, numerous modifications and variations could be made thereto by those skilled in the art without departing from the scope and spirit of the present disclosure set forth in the claims.

What is claimed is:

1. A method for force sensing using information from a display panel with a touch sensor and a fingerprint sensor, the method comprising:
   obtaining, based on touch sensing data from a touch sensing circuit coupled to the touch sensor, first sensing information indicating capacitance value distribution over a touch sensing area due to pressing of an object on the display panel;
   obtaining, based on fingerprint sensing data from a fingerprint sensing circuit coupled to the fingerprint sensor, second sensing information indicating an effective pressing area due to the pressing of the object; and
   generating third sensing information indicating a force corresponding to the pressing of the object, based on the first sensing information and the second sensing information.

2. The method according to claim 1, wherein the force is in positive correlation with an area difference between the touch sensing area and the effective pressing area.

3. The method according to claim 1, wherein the effective pressing area is within and smaller than the touch sensing area.

4. The method according to claim 1, wherein the capacitance value distribution indicates that a plurality of positions within the touch sensing area have respective capacitance values obtainable based on the touch sensing data resulting from deformation of the touch sensor due to the pressing of the object.

5. The method according to claim 1, wherein the second sensing information is obtained by averaging fingerprint sensing values within each of a plurality of blocks over a fingerprint sensing area, based on the fingerprint sensing data, so as to obtain the second sensing information indicating the effective pressing area due to the pressing of the object.

6. The method according to claim 1, wherein obtaining the second sensing information including:
   determining a touch related area based on the first sensing information and a first threshold; and
   determining the second sensing information based on the touch related area, the fingerprint sensing data, a second threshold, wherein the effective pressing area indicated in the second sensing information is equal to or smaller than the touch related area.

7. The method according to claim 6, wherein the touch related area is determined in which each of touch sensing values of the touch related area exceeds or equals the first threshold.

8. The method according to claim 7, wherein the second sensing information is determined in which each of fingerprint sensing values of the effective pressing area exceeds or equals the second threshold.

9. The method according to claim 1, wherein the third sensing information is generated by performing computation at least based on a first weighted sum of touch sensing values of the first sensing information not corresponding to the effective pressing area, and contribution of the touch sensing values that correspond to the effective pressing area is reduced in the computation.

10. The method according to claim 9, wherein any of the touch sensing values that correspond to the effective pressing area is totally excluded from the computation.

11. The method according to claim 9, wherein the touch sensing values that correspond to the effective pressing area is not totally excluded from the computation.

12. The method according to claim 11, wherein the third sensing information is generated by performing the computation additionally based on a second weighted sum of fingerprint sensing values of the second sensing information, wherein the touch sensing values that do not correspond to the effective pressing area dominate results of the computation.

13. An electronic module capable of facilitating force sensing, wherein the electronic module is used to be coupled to a display panel with a touch sensor and a fingerprint sensor, the electronic module comprising:
   a touch sensing circuit for being coupled to the touch sensor and outputting touch sensing data;
   a fingerprint sensing circuit for being coupled to the touch sensor and outputting fingerprint sensing data; and
   at least one control unit, coupled to the touch sensing circuit and the fingerprint sensing circuit, the at least one control unit being configured to perform operations for force sensing including:

obtaining, based on the touch sensing data, first sensing information indicating capacitance value distribution over a touch sensing area due to pressing of an object on the display panel;

obtaining, based on the fingerprint sensing data, second sensing information indicating an effective pressing area due to the pressing of the object; and generating third sensing information indicating a force corresponding to the pressing of the object, based on the first sensing information and the second sensing information.

14. The electronic module according to claim 13, wherein the force is in positive correlation with an area difference between the touch sensing area and the effective pressing area.

15. The electronic module according to claim 13, wherein the effective pressing area is within and smaller than the touch sensing area.

16. The electronic module according to claim 13, wherein the capacitance value distribution indicates that a plurality of positions within the touch sensing area have respective capacitance values obtainable based on the touch sensing data resulting from deformation of the touch sensor due to the pressing of the object.

17. The electronic module according to claim 13, wherein the at least one control unit is configured to average fingerprint sensing values within each of a plurality of blocks over a fingerprint sensing area, based on the fingerprint sensing data, so as to obtain the second sensing information indicating the effective pressing area due to the pressing of the object.

18. The electronic module according to claim 13, wherein the at least one control unit is configured to determine a touch related area based on the first sensing information and a first threshold, and determine the second sensing information based on the touch related area, the fingerprint sensing data, a second threshold, wherein the effective pressing area indicated in the second sensing information is equal to or smaller than the touch related area.

19. The electronic module according to claim 18, wherein the at least one control unit is configured to determine the touch related area in which each of touch sensing values of the touch related area exceeds or equals the first threshold.

20. The electronic module according to claim 19, wherein the at least one control unit is configured to determine the second sensing information in which each of fingerprint sensing values of the effective pressing area exceeds or equals the second threshold.

21. The electronic module according to claim 13, wherein the at least one control unit performs computation to generate the third sensing information, at least based on a first weighted sum of touch sensing values of the first sensing information not corresponding to the effective pressing area, and contribution of the touch sensing values that correspond to the effective pressing area is reduced in the computation.

22. The electronic module according to claim 21, wherein any of the touch sensing values that correspond to the effective pressing area is totally excluded from the computation.

23. The electronic module according to claim 21, wherein the touch sensing values that correspond to the effective pressing area is not totally excluded from the computation.

24. The electronic module according to claim 23, wherein the at least one control unit performs the computation additionally based on a second weighted sum of fingerprint sensing values of the second sensing information, wherein the touch sensing values that do not correspond to the effective pressing area dominate results of the computation.

25. The electronic module according to claim 13, wherein the electronic module is implemented in a single chip.

26. A computing apparatus comprising:
a display panel with a touch sensor and a fingerprint sensor;

first means, coupled to the touch sensor, for obtaining first sensing information indicating capacitance value distribution over a touch sensing area due to pressing of an object on the display panel;

second means, coupled to the fingerprint sensor, for obtaining second sensing information indicating an effective pressing area due to the pressing of the object; and third means, coupled to the first means and second means, for generating third sensing information indicating a force corresponding to the pressing of the object, based on the first sensing information and the second sensing information;

wherein the computing apparatus is capable of performing at least one operation selectively based on the third sensing information.

27. The computing apparatus according to claim 26, wherein the force is in positive correlation with an area difference between the touch sensing area and the effective pressing area.

28. The computing apparatus according to claim 26, wherein the first sensing information includes touch sensing values, and a portion of the touch sensing values that correspond to the effective pressing area is totally excluded from the computation so as to generate the third sensing information.

29. The computing apparatus according to claim 26, wherein the first sensing information includes touch sensing values, and a portion of the touch sensing values that correspond to the effective pressing area is not totally excluded from the computation.

30. The computing apparatus according to claim 26, further comprising:
a single chip, the single chip includes the first means, the second means, and third means; and
a processing unit, coupled between the display panel and the single chip, configured to perform the at least one operation selectively based on the third sensing information.

31. The computing apparatus according to claim 26, further comprising:
a single chip, the single chip includes the first means and the second means,
wherein the third means is a processing unit coupled between the display panel and the single chip, and the processing unit is configured to perform the at least one operation selectively based on the third sensing information.

* * * * *